United States Patent [19]

Fornes

[11] Patent Number: 4,550,495
[45] Date of Patent: Nov. 5, 1985

[54] NUT KERNEL EXTRACTOR

[76] Inventor: Gaston G. Fornes, 2400 Bennington Rd., Charlottesville, Va. 22901

[21] Appl. No.: 449,590

[22] Filed: Feb. 16, 1983

[51] Int. Cl.⁴ .................. A47J 43/26; B26B 17/00
[52] U.S. Cl. .................... 30/120.3; 30/193; 30/279
[58] Field of Search ............. 30/120.1, 120.2, 120.3, 30/120.4, 120.5, 176, 177, 193, 298; 99/568, 577, 578, 582

[56] References Cited

U.S. PATENT DOCUMENTS

| 257,982 | 5/1882 | Schmidt | 30/176 X |
|---|---|---|---|
| 2,596,382 | 5/1952 | Duke | 99/578 X |
| 3,338,281 | 8/1927 | Davy | 30/120.4 |
| 4,240,201 | 12/1980 | Sawby et al. | 30/161 |

FOREIGN PATENT DOCUMENTS

| 232827 | 5/1959 | Australia | 30/120.3 |
|---|---|---|---|
| 2704244 | 8/1977 | Fed. Rep. of Germany | 30/193 |
| 439263 | 12/1935 | United Kingdom | 30/120.3 |

Primary Examiner—Douglas D. Watts
Attorney, Agent, or Firm—Daniel P. Burke

[57] ABSTRACT

This invention relates to a light weight, portable, hand-operated device for extracting the kernels of very hard-shell edible nuts in premium-size pieces without crushing. On black walnuts the device is effectively used: first to split the nut along its natural suture; and then by using its tooth-like nippers, the hard shell of each black walnut half is split into very large portions along five outlined paths thereby releasing the kernel in large premium-size pieces. The invention is comprised of jaws with nippers, a lock to hold the jaws closed, a splitter blade mounted on one handle and a slotted safety ring mounted on the other handle adjacent to the splitter blade.

1 Claim, 14 Drawing Figures

NUT KERNEL EXTRACTOR

This invention relates to new means and method to extract the kernals of very hard-shell nuts.

It has long been a problem to crack very hard-shell nuts in a way that large premium-size pieces of the kernel can be extracted therefrom. It is a widely accepted fact that the kernels of the black walnut are the most difficult of the edible nut meats to extract. Therefore, it is obvious that any successful device and method effective for black walnuts may be used to extract the kernels of various other kinds of nuts.

A serious disadvantage found in hand-operated nutcrackers and nut shellers of conventional type is the tendency of these devices to crack and smash the shell into many small pieces and to break and crush the kernel, leaving shell and pieces of kernel intermingled. This usually happens because very high breaking pressures are applied and once the shell starts to yield, total collapse is swift and the hand control is not adequate to prevent the shattering of the nut.

The principle object of the present invention is to provide a nut-shell remover in which the nut can be hand-held and a pair of tooth-like nippers set in the upper end portions of the hand levers, substantially at right angles thereto, which will permit the tooth-like nippers to be used to separate the nut shell from the kernel without damage to the nut meats.

A further object of the invention is the provision of means for splitting the nut from the bud end to the stem end cleanly and neatly.

Another object of the invention is to provide for splitting of both small and large nuts without having to size the nuts or need to make any adjustments to the extractor.

A further object of the invention is to provide for the safety of the person of the operator during the extracting process.

Another object of the invention is to extract the kernel in premium-size pieces. For the black walnut: five premium-size pieces comprising 98% of the edible kernel would be optimum.

A further object of the invention is to provide an extractor which will be portable and small enough to fit into a workman's coat-pocket.

Another object of the invention is to provide an extractor which is: quiet in operation, simple to maintain, light in weight, and which can be comfortably operated with the hands.

A further object of the invention is that its essential parts be so designed and built to resist wear and corrosion and that such essential parts be replaceable.

Other objects and advantages of the invention will become apparent during the course of the following description of the drawings, and also from the detailed description of a preferred embodiment and its method of use to extract the kernel of the black walnut.

DETAILED DESCRIPTION OF THE DRAWINGS

Figure 1A:
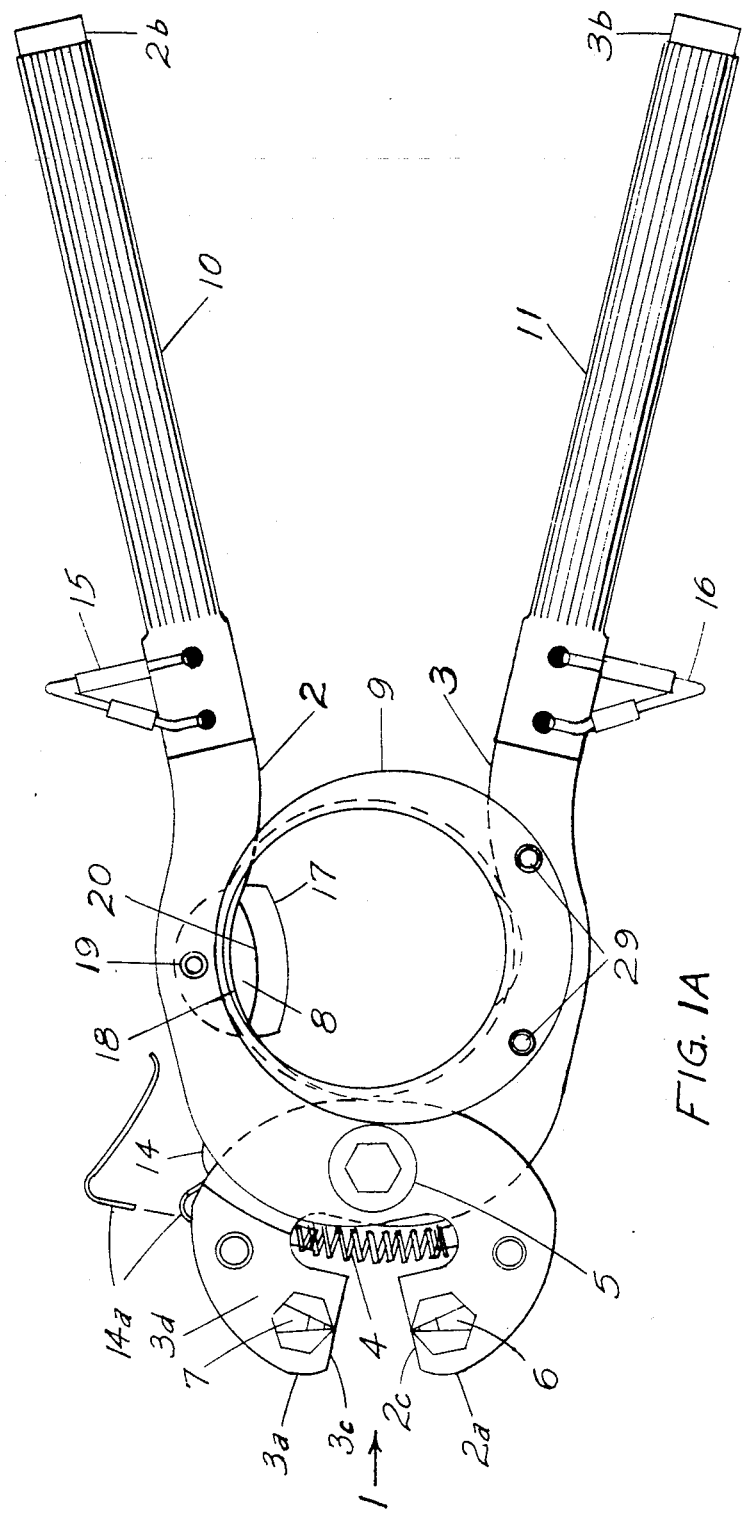
FIG. 1A is a front view of one embodiment of an extractor constructed in accordance with the invention in which the device is positioned for starting the extraction of the kernel of large size nuts.
Figure 2:
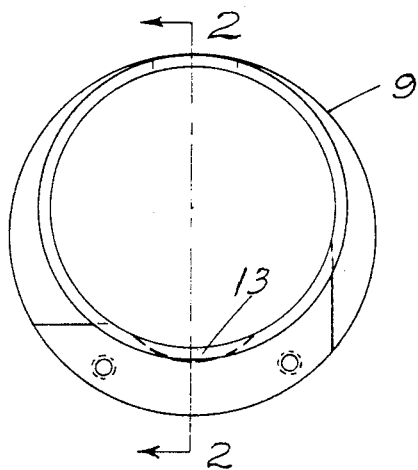
FIG. 2 is a front view of the safety ring.
Figure 3:
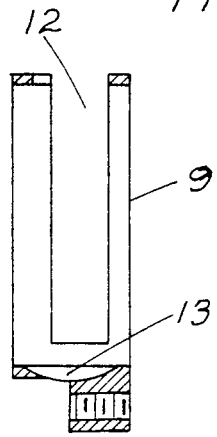
FIG. 3 is an elevation sectional view on the line 3—3 of FIG. 2.

Referring to FIG. 1A, the extractor 1 comprises a first handle 2 and a second handle 3 each having a first end 2a, 3a and a second end, 2b, 3b; a fastener 5 pivotally connecting the handles 2, 3; a pair of tooth-like nippers 6, 7 mounted on the first ends 2a, 3a of the handles 2, 3; a splitter 8; and a pair of hollow grips 10, 11, connected to the second ends of the two handles 2, 3. The handles 2, 3 are connected by the fastener 5 at a point other than at the ends of handles 2, 3 to cause the first ends 2a, 3a of the handles to approach each other when their second ends 2b, 3b are forced together. When the second ends 2b, 3b are forced together the extractor 1 is in a closed position and when they are relaxed the extractor 1 is in the open position shown in FIG. 1A. The first ends 2a, 3a have substantially flat contacting surfaces 2c, 3c which meet when the extractor 1 is in the closed position. The safety ring 9 is fitted and firmly attached by two cap screws 29 to the second handle 3 and has a slot 12 shown in FIG. 3 through which the first handle 2 and the splitter 8 passes. The safety ring 9 also has a pocket 13 shown in FIGS. 2 and 3 which is located in the inner surface of the safety ring 9 adjacent the second handle 3. The extractor 1 also comprises biasing means 4 which urge the handles 2, 3 apart to an open position; a retractable locking means 14 shown in FIGS. 8 and 9 and which passes through a reamed hole (not shown) in the second handle 3 at a point between the fastener 5 and the tooth-like nipper 7, providing means to constrain the handles 2, 3 in the closed position, and safety stops 15, 16 on the grips 10, 11 connected to the handles 2, 3.

Figure 4:
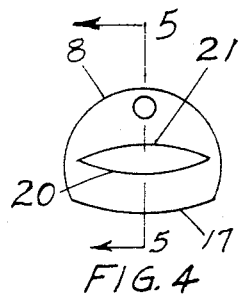
FIG. 4 is a front view of the nut splitter.
Figure 5:
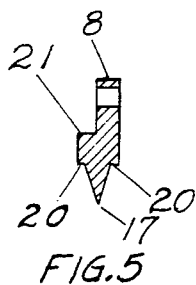
FIG. 5 is an elevation sectional view taken on the line 5—5 of FIG. 4.

The extractor 1 can incorporate several modifications without departing from the spirit and scope of the invention. The following is a description of the preferred embodiment. The splitter 8 of the preferred embodiment of the extractor 1 has a convex edge 17 which reduces the length of the actual cutting line and increases the unit pressure effects of the cutting edge when it is used as described below. By actual cutting line is meant, that particular part of the cutting edge which actually contacts the item 50 being split. Referring to FIGS. 4 and 5 the splitter 8 has shoulders 20 which face the convex edge 17 and are a set distance therefrom. The shoulders 20 prevent the splitter 8 from passing too far into item 50. The splitter 8 also has a curved rim 21 which contacts the inner surface 18 of the first handle 2. The splitter 8 is secured to the first handle 2 by a splitter fastener 19 (see FIG. 1A). The rim 21 of the splitter 8 transmits the force applied to the cutting edge 17 directly to the first handle 2, distributes the force along the entire area of the first handle 2 which the curved rim contacts, and minimizes the shearing force applied to the splitter fastener 19. With this design the splitter 8 is held in secure alignment with the first handle 2 through minimal stress on the splitter fastener 19.

Figure 6:
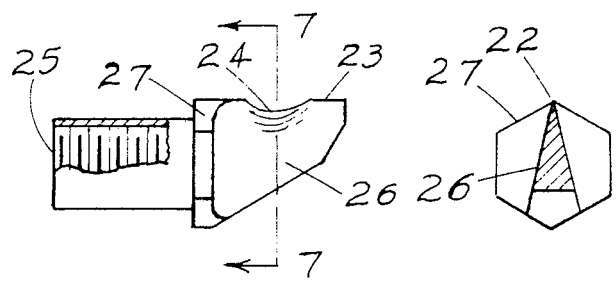
FIG. 6 is an enlarged front view of the tooth-like nipper.
Figure 7:
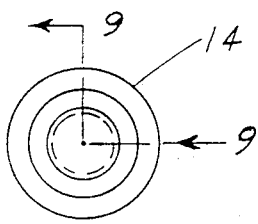
FIG. 7 is an elevation sectional view on the line 7—7 of FIG. 6.

As shown in FIG. 1A and in the enlarged views FIGS. 6 and 7, the tooth-like nippers 6, 7 of the preferred embodiment have three continuous sections: an internally threaded mounting section 25, a supporting base 27 and a tapered nipping section 26. The internally threaded mounting section 25 of each tooth-like nipper 6, 7 is held in holes (not shown) in the first end 2a, 3a of the handles 2, 3 by securing cap screws 28 shown in FIG. 1C that are screwed into the mounting section 25 from the opposite side of the handles 2, 3.

The supporting base section 27 is held snugly against the handles 2, 3 by cap screws 28. The tapered nipping section 26 is tapered in two directions, firstly, the nipping section is narrower at the point farthest from the handles than it is at a point where it contacts the base section 27. Secondly, the nipping section 26 is tapered to form a sharp edge 22. The sharp edge 22 of each tooth-like nipper 6, 7 has a flat section 23 and a relieved section 24. The flat section 23 is on the part of the sharp edge 22 which is farthest from the base section 27. The relieved section 24 is on the sharp edge between the flat section 23 and the supporting base section 27. The advantage of providing a relieved section is that it decreases the length of the sharp edge which will actually contact the item being nipped and thereby increases the unit pressure effects of the edge. The tooth-like nippers 6, 7 are mounted on the first ends 2a, 3a of the handles 2, 3 substantially perpendicular to said handles so that the sharp edges 22 approximately face each other when the extractor 1 is in the closed position. In the preferred embodiment, the tooth-like nippers 6, 7 are mounted so that the sharp edges 22 are slightly recessed from the plane of the contacting surfaces 2c, 3c. With this design feature, the sharp edges 22 come close but never touch and thereby avoid unnecessary contact which might cause dullness and/or misalignment. Check-plates 2d and 3d (see FIGS. 1A and 1C) are used in this embodiment providing additional mounting support for the tooth-like nippers 6, 7 and are held in place by capscrews 28 to the first ends 2a, 3a of the handles 2, 3.

Figure 1B:
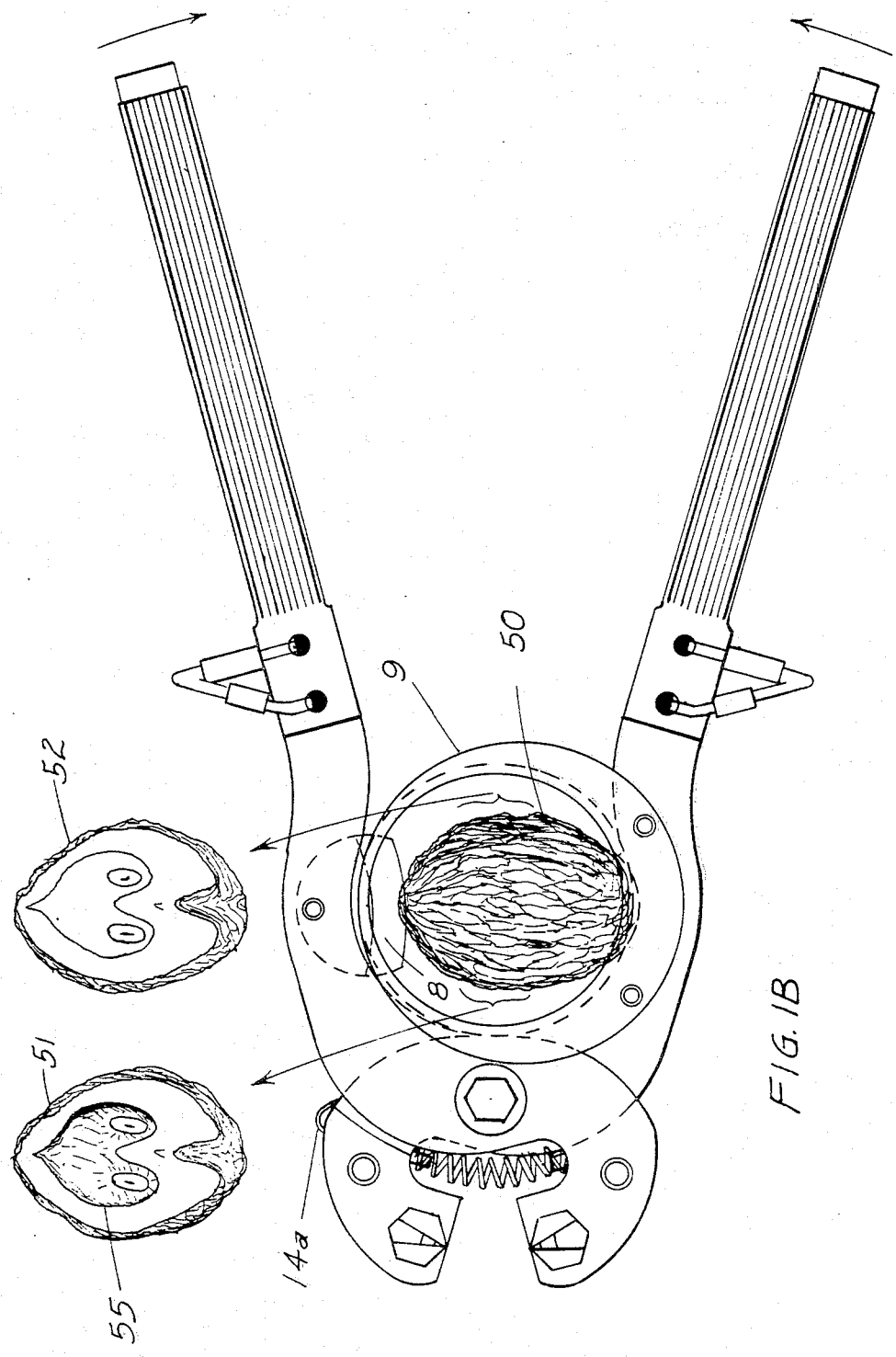
FIG. 1B is a front view of the extractor in which a black walnut is properly positioned in the device for splitting into halves.
Figure 8:
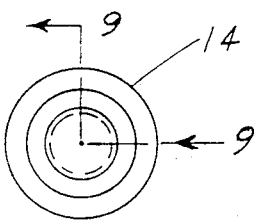
FIG. 8 is an enlarged front view of the locking pin.
Figure 9:
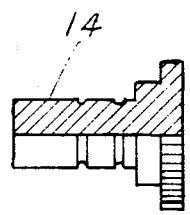
FIG. 9 is an elevation sectional view taken on the line 9—9 of FIG. 8.

The retractable locking means 14 of the preferred embodiment are in the form of a retractable locking pin 14 (see FIGS. 8 and 9). The retractable locking pin 14 passes through a reamed hold (not shown) in the second handle 3 at a point between the fastener 5 and the tooth-like nipper 7. The retractable locking pin 14 can be put in an extended position. When the retractable locking pin 14 is in the retracted position, the handles 2, 3 are free to rotate about the fastener 5. In the retracted position the retractable locking pin 14 only extends out of one side of the handle 3 and this is the side opposite to that which the other handle 2 is attached, thus in the retracted position the retractable locking pin 14 does not interfere with the relative rotation of the handles 2, 3. To lock the extractor 1 in the closed position, the handles 2, 3 are squeezed until the flat connecting surfaces 2c, 3c meet and then the retractable locking pin 14 is pushed through its reamed hole (not shown) so that it extends through both sides of its reamed hole (not shown) and thus obstructs the rotation of the handles 2, 3 in respect to each other. The retractable locking pin 14 is held in either position by a single leaf detent spring 14a which restricts the lateral motion of the retractable locking pin 14. In FIGS. 1A and 1B a single leaf detent spring 14a is shown in position. In FIG. 1A an additional single leaf detent spring 14a is depicted to illustrate the shape and relative size of the spring 14a. Other advantages of the specific design will be more apparent upon consideration of the method of use of the present invention.

A Preferred Method of Using the Extractor

Figure 10:
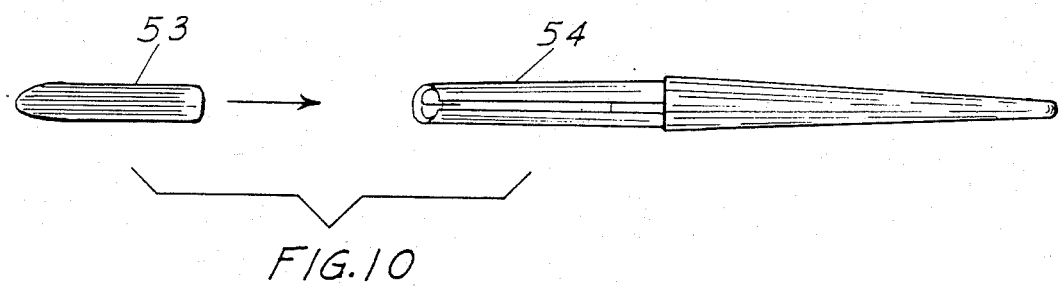
FIG. 10 is a plan view of a kernel cutter.
Figure 11:
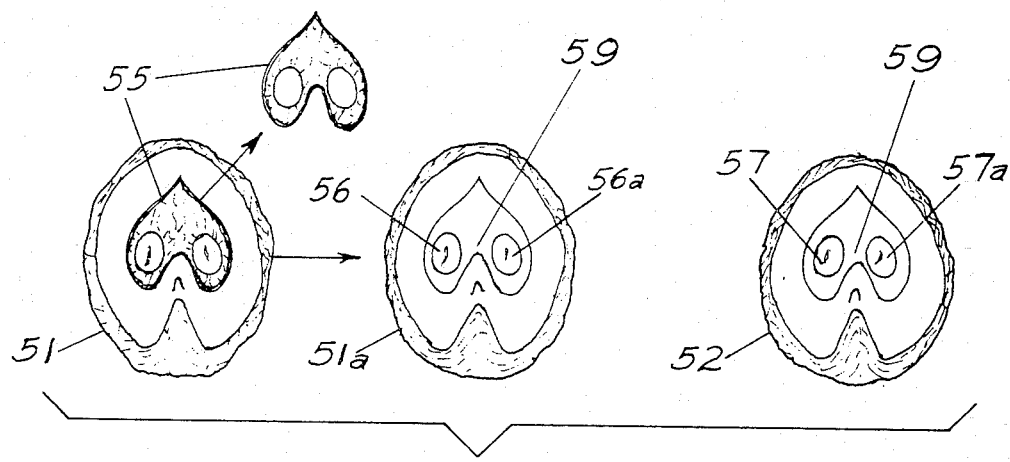
FIG. 11 is a plan view of the black walnut halves showing their open split faces.
Figure 12:
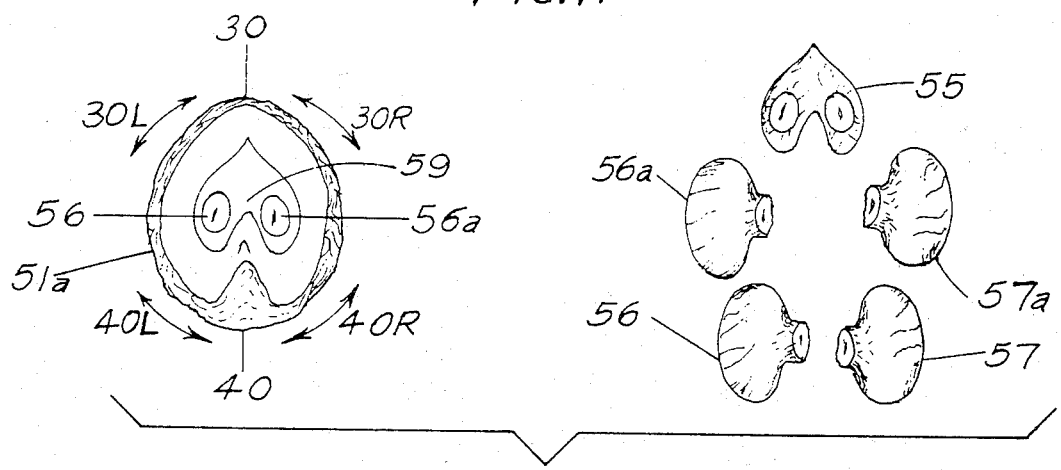
FIG. 12 is a plan view of a black walnut half showing the plan and direction for cuts made by the tooth-like nippers when extracting the kernel lobe pieces. Also shown are premium-size pieces of the kernel from a single black walnut.

An examination of one of the many possible hardshell nuts being split is useful in understanding the preferred method of use of the extractor. The following is a brief description of the black walnut (see FIGS. 1c and 12). The black walnut is generally oval, it has a suture (not shown) that firmly binds the nut halves and which extends around the circumference of the nut, and it has two very distinct ends, a stem end 40 and a bud end 30. The stem end 40 is usualy slightly flatter than the bud end 30, and also has a distinct indentation. The interior of the black walnut 50 houses the kernel which has a central heart-shaped piece 55. The remainder of the kernel comprises four lobe pieces 56a, 56, 57a, 57 which are attached to the central heart-shaped piece 55. When a black walnut is carefully split down its suture from the bud end to the stem end into halves, the heart-shaped piece 55 and two lobe pieces 56, 56a remain in the first half 51 of the nut and the other two lobe pieces 57, 57a remain in the second half 52 of the nut. The heart-shaped piece 55 can be separated from the first half of the shell 51 with a simple kernal cutter 53 which has a semi-circular cross-section and a sharp rounded blade end (see FIG. 10). The simple kernel cutter 53 can be made using a slightly modified old-fashioned dip type writing pen fitted into a staff style pen holder. The kernel cutter can be stored in one of the hollow grips (10 or 11). A more detailed description of the kernel cutter 53 is deemed not necessary since the inventive concept of this extractor and its preferred method of use does not rely on the novelty of the cutter. The four lobe pieces remain secured in the lobe holes of the shell. After the heart-shaped piece 55 has been removed, each nut half 51a and 52 has a heart-shaped cavity, along with two lobe pieces (56, 56a or 57, 57a) which are separated by an arch-portion 59 of the shell (see FIG. 11).

Though the nut halves are not rounded they can be described as being generally hemispherical. The generally hemispherical nut half consists of four quadrants: a right and a left quadrant at the bus end 30 (30R and 30L respectively) and a right and left quadrant at the stem end 40 (40R and 40L respectively). Thus, an imaginary line can be thought to divide each nut half into two sides, a right side and a left side. The arch-portion 59 of the shell lies on this imaginary line.

To split the black walnut 50, referring to FIG. 1B, a black walnut 50 is positioned in the safety ring 9 of extractor 1 with the stem end 40 in the pocket 13 and the bud end 30 facing the splitter 8, whereby splitter 8 can be pushed by squeeze forces acting on the handles 2, 3 into the suture at its bud end 30 causing the black walnut to separate into halves 51, 52. The proper positioning of the nut in the pocket 13 is helpful in insuring that the nut is split and the heart-shaped piece 55 remains intact.

Figure 1C:
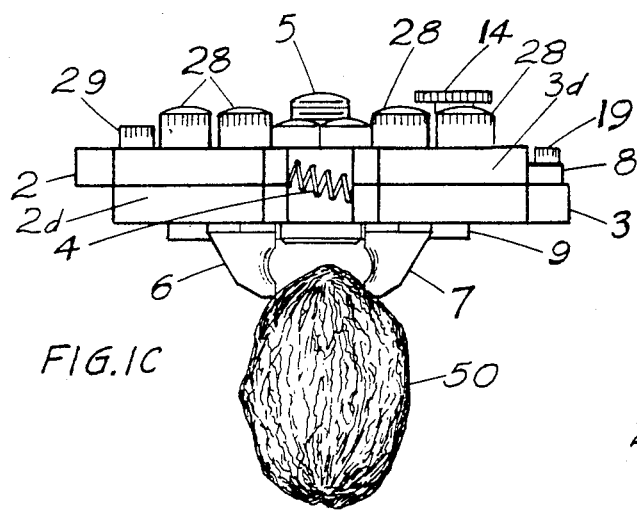
FIG. 1C is a side elevation view of the first end of the extractor and viewed as far as the approximate center of the safety ring showing the tooth-like nippers ready to split a black walnut.

An alternate method of splitting a black walnut 50 utilizes the tooth-like nippers 6, 7 of the extractor 1 (see FIG. 1C). In this alternate method the tooth-like nippers 6, 7 are placed in the suture (not shown) at the bud end 30 of the nut. In this method a relatively light squeeze force on the handle grips 10, 11 will cause the black walnut 50 to split into halves 51, 52. After removing the heart-shaped piece 55 as described above, the nut halves 51a, 52 are ready for extraction of the four lobe pieces.

The extraction of the lobe pieces is accomplished by making a series of cuts in the nut shell with the tooth-like nippers 6, 7. The series of cuts can be and ought to be made while the shell half is held in the palm of the person doing the cutting. Firstly, one of the tooth-like nippers 6 or 7 is placed in the right lobe hole and the other tooth-like nipper is placed on the external surface of the shell in the right quadrant of the stem end 40R. The tooth-like nipper on the external surface of the shell can be located on any point in the right quadrant of the stem end 40R; however, the best positioning of this tooth-like nipper has been found to be on a point which will cause a cut substantially parallel to the imaginary line that separates the right and left sides of the nut half. The grips 10, 11 are then squeezed and a cut is made in the right quadrant of the stem end 40R of the nut. A second cut is similarly made between the right lobe hole and the right quadrant of the bud end 30R substantially parallel to the above said imaginary line. These two cuts are sufficient to remove the right external shell section from the shell half 51a. In fact, with a properly cured and dried black walnut the first cut is often adequate to cause a continuous fracture in the right side of the shell (from 40R to 30R) thereby causing the right external shell section to fall from the nut half 51a. To remove the left external shell section the person using the extractor 1 need only rotate the nut half 51a approximately 180 degrees about a vertical axis perpendicular to the face of the nut in his palm and make similar cuts in the left side of the nut shell half, first at the stem end and then at the bud end. This will cause the left external shell section to fall from the nut half 51a. Lastly, it is necessary to cut the arch-portion 59 of the shell to totally free the lobe pieces (56 and 56a in FIG. 12) from the nut half 51a. A similar series of cuts is next made in the other half 52 of the nut, thereby freeing the other two lobe pieces (57 and 57a in FIG. 12). Thus, it can be appreciated that five premium-size pieces can be easily and cleanly extracted from a black walnut, leaving the mess, i.e., the broken pieces of the shell, in the palm of the person using the extractor 1 for simple discarding.

In many respects it is obvious and to be understood that many details described herein and illustrated may be altered by some of those skilled in the art without necessarily departing from the spirit and scope of the invention as expressed in the appended claims.

What is claimed is:

1. A nut kernel extractor comprising:
   (a) first and second handles, each of said handles having a major longitudinal axis, wherein each of said handles has a first end and a second end,
   (b) wherein said handles are pivotally connected at a point between said first ends and said second ends such that each of said handles comprises a right side extending from said pivotal connection to said second end and a left side extending from said pivotal connection to said first end,
   (c) said extractor further comprising a first nipper mounted on said first end of said first handle and a second nipper mounted on said first end of said second handle,
   (d) wherein each of said nippers comprises a linear cutting edge, wherein
   (e) said nippers are mounted such that said linear cutting edges are always parallel,
   (f) and wherein each of said nippers also comprises a sharpened relieved section,
   (g) wherein said nippers are positioned on said first ends such that one of said cutting edges is pivotally positionable close enough to said other cutting edge to cut the shell of a split nut,
   (h) and wherein said extractor further comprises a splitter and a slotted safety ring wherein said splitter is mounted on said right side of said first handle and said safety ring is attached to said right side of said second handle,
   (i) wherein said splitter comprises a shoulder wherein said shoulder comprises a surface which is substantially perpendicular to the surface of said splitter thereby preventing excessive penetration of said splitter,
   (j) wherein said safety ring has a pocket comprising a relieved section in said safety ring and wherein said pocket is positioned opposite to said splitter such that when force is applied to a nut with said splitter, the nut is held securely in said pocket,
   (k) said extractor further comprising biasing means connected to said left side of each of said handles wherein said biasing means urge said first ends apart,
   (l) said extractor further comprising retractable locking means comprising a retractable locking pin and a single leaf detent spring wherein said pin has two circumferential grooves and said pin passes through said left side of said second handle and protrudes from said second handle to obstruct the relative rotation of said first and second handles when said pin is in a locking position, and wherein said spring is positioned adjacent to said pin such that said spring rests in one of said grooves when said pin is in a retracted position and in the other of said grooves when said pin is in a locking position.

* * * * *